US006928082B2

(12) United States Patent
Liu et al.

(10) Patent No.: US 6,928,082 B2
(45) Date of Patent: Aug. 9, 2005

(54) SYSTEM AND METHOD FOR DETERMINING A CONNECTIONLESS COMMUNICATION PATH FOR COMMUNICATING AUDIO DATA THROUGH AN ADDRESS AND PORT TRANSLATION DEVICE

(75) Inventors: Fu-Hua Liu, Cupertino, CA (US); Shih-An Cheng, Milpitas, CA (US); Chen-Huei Chang, Cupertino, CA (US); Chih-Ping Lee, Cupertino, CA (US)

(73) Assignee: Innomedia PTe Ltd, Singapore (SG)

( * ) Notice: Subject to any disclaimer, the term of this patent is extended or adjusted under 35 U.S.C. 154(b) by 959 days.

(21) Appl. No.: 09/819,492

(22) Filed: Mar. 28, 2001

(65) Prior Publication Data

US 2002/0141384 A1 Oct. 3, 2002

(51) Int. Cl.[7] .............................................. H04L 12/28
(52) U.S. Cl. ...................... 370/401; 370/392; 370/351; 370/352; 370/356; 370/389; 709/223; 709/238
(58) Field of Search ................................. 370/401, 392, 370/351, 352, 356, 389, 475; 709/223, 238

(56) References Cited

U.S. PATENT DOCUMENTS

| 5,799,068 | A | | 8/1998 | Kikinis et al. | |
|---|---|---|---|---|---|
| 5,916,302 | A | | 6/1999 | Dunn et al. | |
| 6,075,783 | A | | 6/2000 | Voit | |
| 6,101,189 | A | * | 8/2000 | Tsuruoka | ..................... 370/401 |
| 6,157,950 | A | * | 12/2000 | Krishnan | ..................... 709/223 |
| 6,321,253 | B1 | | 11/2001 | McKeen et al. | |
| 6,353,614 | B1 | * | 3/2002 | Borella et al. | .............. 370/389 |
| 6,480,508 | B1 | * | 11/2002 | Mwikalo et al. | ............ 370/475 |
| 6,563,824 | B1 | * | 5/2003 | Bhatia et al. | ................ 370/392 |
| 6,779,039 | B1 | * | 8/2004 | Bommareddy et al. | ..... 709/238 |
| 6,822,943 | B1 | * | 11/2004 | Mantin | ........................ 370/254 |
| 6,822,957 | B1 | * | 11/2004 | Schuster et al. | ............ 370/389 |
| 2002/0038339 | A1 | * | 3/2002 | Xu | .............................. 709/203 |
| 2002/0101859 | A1 | * | 8/2002 | Maclean | ..................... 370/352 |
| 2002/0116532 | A1 | * | 8/2002 | Berg | .......................... 709/246 |
| 2003/0165136 | A1 | * | 9/2003 | Cornelius et al. | ........... 370/356 |

FOREIGN PATENT DOCUMENTS

| EP | 0781015 A | 6/1997 |
|---|---|---|
| EP | 0841831 A | 5/1998 |
| EP | 0966 145 A | 12/1999 |

OTHER PUBLICATIONS

Alan B. Johnston, SIP, Understanding The Session Inination Protocol, 2001, pp. 0–52.

* cited by examiner

*Primary Examiner*—Steven Nguyen
*Assistant Examiner*—Clemence Han
(74) *Attorney, Agent, or Firm*—Timothy P. O'Hagan

(57) ABSTRACT

A method of audio communication utilizing media datagrams between a first telephony client located behind a network address translation (NAT) server and a remote second telephony client is disclosed. Each client utilizes a single port number for both sending and receiving media datagrams. A media datagram is sent from the first telephony client to the second telephony client on a UDP/IP channel utilizing a destination IP address and port number provided by the second telephony client. The second telephony client extracts the source IP address and source port number from the received media datagram to determine if the first telephony client is located behind a NAT server. If the first telephony client is located behind a NAT server, the extracted source IP address and port number are stored and used to send media datagrams to the first telephony client located behind the NAT server.

48 Claims, 5 Drawing Sheets

| Client Source | | Translated Source | | Destination | |
|---|---|---|---|---|---|
| IP Address | Port # | IP Address | Port # | IP Address | Port # |
|  |  |  |  |  |  | ← 32(a)
|  |  |  |  |  |  | ← 32(b)
|  |  |  |  |  |  | ← 32(c)
|  |  |  |  |  |  | ← 32(d)
|  |  |  |  |  |  | ← 32(e)

Figure 2
(Prior Art)

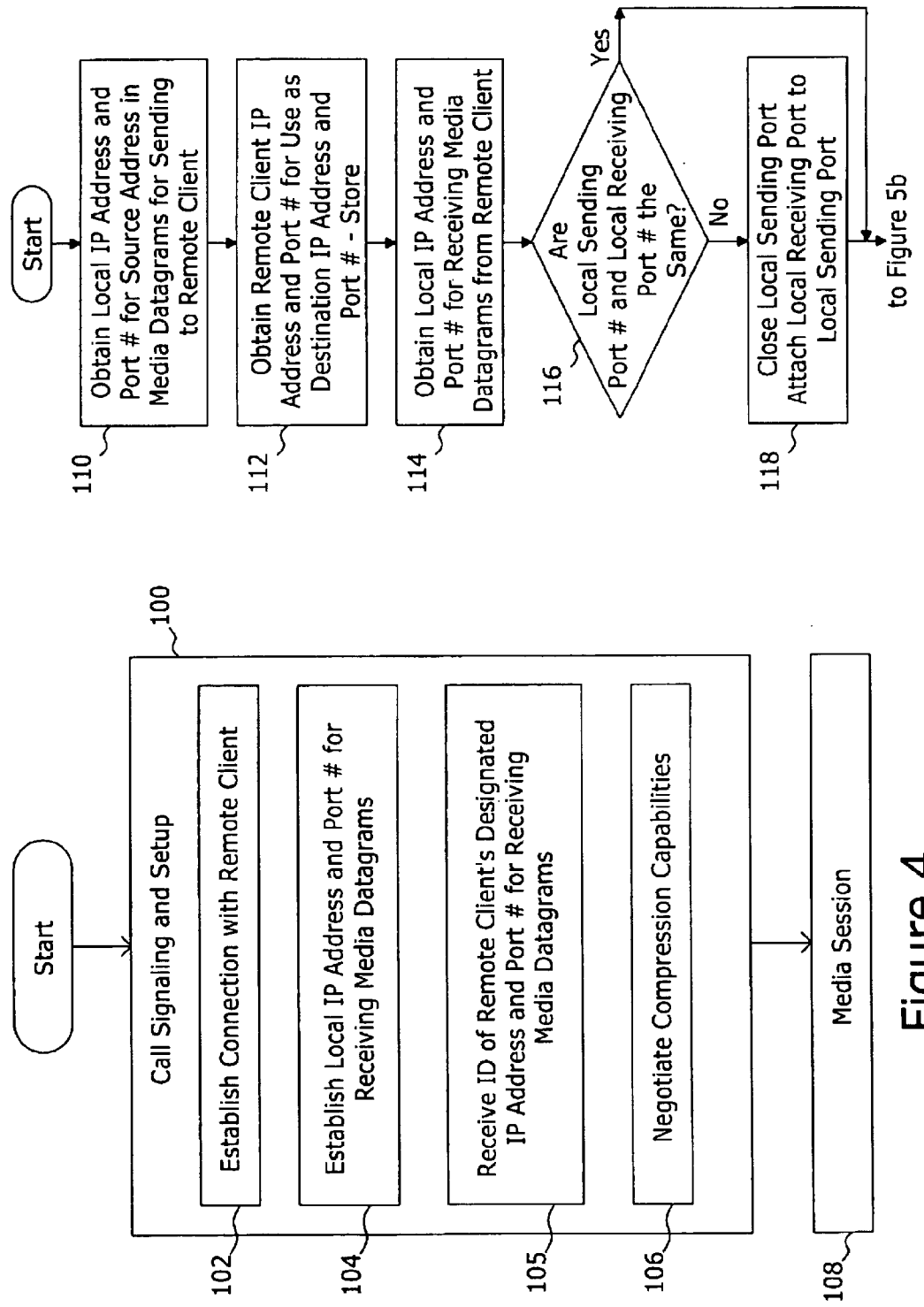

US 6,928,082 B2

SYSTEM AND METHOD FOR DETERMINING A CONNECTIONLESS COMMUNICATION PATH FOR COMMUNICATING AUDIO DATA THROUGH AN ADDRESS AND PORT TRANSLATION DEVICE

TECHNICAL FIELD

The present invention relates to communicating audio data in a packet switched network and, more specifically, to establishing and maintaining Internet telephony communications through a network address translation (NAT) device.

BACKGROUND OF THE INVENTION

For many years voice telephone service was implemented over a circuit switched network commonly known as the public switched telephone network (PSTN) and controlled by a local telephone service provider. In such systems, the analog electrical signals representing the conversation are transmitted between the two telephone handsets on a dedicated twisted-pair-copper-wire circuit. More specifically, each telephone handset is coupled to a local switching station on a dedicated pair of copper wires known as a subscriber loop. When a telephone call is placed, the circuit is completed by dynamically coupling each subscriber loop to a dedicated pair of copper wires between the two switching stations.

More recently, the copper wires, or trunk lines between switching stations have been replaced with fiber optic cables. A computing device digitizes the analog signals and formats the digitized data into frames such that multiple conversations can be transmitted simultaneously on the same fiber. At the receiving end, a computing device reforms the analog signals for transmission on copper wires. Twisted pair copper wires of the subscriber loop are still used to couple the telephone handset to the local switching station.

More recently yet, voice telephone service has been implemented over the Internet. Advances in the speed of Internet data transmissions and Internet bandwidth have made it possible for telephone conversations to be communicated using the Internet's packet switched architecture and the TCP/IP protocol.

Software is available for use on personal computers which enable the two-way transfer of real-time voice information via an Internet data link between two personal computers (each of which is referred to as an end point or client). Each end point computer includes appropriate hardware for driving a microphone and a speaker. Each end point operates simultaneously both as a sender of real time voice data and as a receiver of real time voice data to support a full duplex voice conversation. As a sender of real time voice data, the end point computer converts voice signals from analog format, as detected by the microphone, to digital format. The software then facilitates data compression down to a rate compatible with the end point computer's data connection to an Internet Service Provider (ISP) and facilitates encapsulation of the digitized and compressed voice data into a frame compatible with the user datagram protocol and internet protocol (UDPIIP) to enable communication to the other end point via the Internet.

As a receiver of real time voice data, the end point computer and software reverse the process to recover the analog voice information for presentation to the operator via the speaker associated with the receiving computer.

To promote the wide spread use of internet telephony, the International Telephony Union (ITU) had developed a set of standards for internet telephony. The ITU Q.931 standard relates to call signaling and set up, the ITU H.245 standard provides for negotiation of channel usage and compression capabilities between the two endpoints, and the ITU H.323 standard provides for real time voice data between the two end points to occur utilizing UDP/IP to deliver the real time voice data.

A problem associated with standard ITU Internet telephony is that if one of the end points is on a private network behind a network address translation (NAT) firewall, the other endpoint can not send UDPI/IP frames through the NAT firewall onto the private network for delivery to the private network endpoint. More specifically, ITU Internet telephony standards provide for each endpoint to designate a port number for receipt of the datagrams representing audio data and to communicate the IP address and designated port for receipt of the audio datagrams to the other endpoint. Because the private network client does not have a globally unique IP address, a frame sent to such non-globally unique IP address can not be routed on the Internet and will be lost. Further, even if the private network client were able to identify and designate the IP address of the NAT firewall, the private network client has no means for establishing a port on the NAT firewall for receipt of audio datagrams.

Because of the wide spread use of NAT firewalls which typically provide both IP address translation and port translation of all frames sent from the private network to the Internet, what is needed is a system and method for establishing and maintaining internet telephony conversations between two clients even if one of the clients is located on a private network behind a NAT firewall.

SUMMARY OF THE INVENTION

A first aspect of the present invention is to provide a method of audio communication between a first and a second telephony client. The method comprises establishing a call signaling connection between the first telephony client located on a private network and the second telephony client on the Internet and utilizing the call signaling connection to provide to the first telephony client an IP address and port number of the second telephony client for receipt of media (e.g. digital voice) datagrams from the first telephony client. A plurality of media datagrams are sent from the first telephony client to the second telephony client utilizing the IP address and port number designated by the second telephony client for receipt of media datagrams as the destination address and destination port number for each media datagram. When such media datagrams are received by the second telephony client, the source IP address and source port number are extracted from at least one media datagram. The extracted IP address may be compared to an IP address provided by the first telephony client to determine that the first telephony client is located on a private network. Because the first telephony client is located on a private network, the second telephony client utilizes the extracted IP address and port number as the destination IP address and port number for sending a plurality of media datagrams to the first telephony client. Further, the second telephony client may use the same IP address and port number that it established for receipt of media datagrams from the first telephony client as the source IP address and port number for sending media datagrams to the first telephony clients such that it uses only a single port number for both sending and receiving media datagrams.

In one embodiment, each media datagram sent by the second telephony client to the first telephony client utilizes, for the destination IP address and port number, the extracted IP address and extracted port number that are extracted from the most recent media datagram received by the second telephony client from the first telephony client. Each extracted IP address and extracted port number may be stored in a memory and the memory may be updated each time either a new IP address or new port number is extracted from a media datagram received at the second telephony client from the first telephony client. The IP address and port number stored in the memory are used for the destination IP address and destination port number for each of the media datagrams sent form the second telephony client to the first telephony client.

In another embodiment, each media datagram sent by the second telephony client to the first telephony client utilizes an extracted IP address and an extracted port number which are extracted from one of the media datagrams received by the second telephony client from the first telephony client within a limited period of time prior to sending the media datagram. Again, each extracted IP address and extracted port number may be stored in a memory and the memory may be updated each time either a new IP address or new port number is extracted from a media datagram received by the second telephony client. The IP address and port number stored in the memory are used for the destination IP address and destination port number for each of the media datagrams sent by the second telephony client to the first telephony client within a limited period of time after being stored.

A second aspect of the present invention is to provide a method of communicating audio data with a remote telephony client. The method comprises establishing a port number for receipt of media datagrams from the remote telephony client and communicating such port number to the remote telephony client. Media datagrams are then received from the remote telephony client on the established port number. The source IP address and source port number are extracted from at least one datagram received from the remote telephony client. The extracted source address may be compared to an IP address provided by the remote telephony client to determine if they match. If they do not match, it can be concluded that the remote telephony client is located on a private network behind a NAT server. As such, the extracted IP address and port number are used as the destination IP address and port number for sending each media datagram to the remote telephony client. Further, the port number established for receipt of media datagrams from the remote telephony client may be utilized as the source port number for sending each media datagram to the remote telephony client such that only a single port number is utilized for both sending and receiving media datagrams.

In one embodiment, the method further includes extracting the source port number from each of the plurality of media datagrams received from the remote telephony client and utilizing the source port number extracted from the most recently received media datagram as the destination port number for sending of each of the plurality of media datagrams to the remote telephony client. Further yet, the method may include extracting the source IP address from each of the plurality of media datagrams received from the remote telephony client and utilizing the source IP address extracted from the most recently received media datagram as the destination IP address of each of the plurality of media datagrams sent to the remote telephony client.

In a second embodiment, the method further includes storing the source IP address and source port number extracted from one of the media datagrams received from the remote telephony client in a memory, extracting the source port number from a plurality of media datagrams received from the remote telephony client, storing an updated source port number in memory when an extracted source port number is different than the source port number previously stored in the memory, and utilizing the source IP address and source port number stored in memory as the destination IP address and destination port number for each of the plurality of media datagrams sent to the remote telephony client. Further yet, the method may include extracting the source IP address from a plurality of media datagrams received from the remote telephony client and storing an updated source IP address in memory when an extracted IP address is different than the IP address stored in memory.

In a third embodiment, the method further includes extracting the source port number from each of the plurality of media datagrams received from the remote telephony client and utilizing the source port number extracted from one of the media datagrams which was received within a limited period of time prior to sending each media datagram as the destination port number of each of the media datagrams sent to the remote telephony client. Further yet, the method may include extracting the source IP address from each of the plurality of media datagrams received from the remote telephony client and utilizing the source IP address extracted from one of the media datagrams which was received within a limited period of time prior to sending each media datagram as the destination IP address of each of the media datagrams sent to the remote telephony client.

A third aspect of the present invention is to provide a telephony client. The client comprises a network interface circuit for both sending media datagrams to a remote telephony client and for receiving media datagrams from the remote telephony client on the same port number. An audio interface system converts a sequence of media datagrams received from the remote telephony client to analog audio data for driving a speaker and for converting analog audio data from a microphone to a sequence of media datagrams for sending to the remote telephony client. The datagram generation module operates to extract the source IP address and source port number from at least one media datagram received from the remote telephony client. The datagram generation module may compare the extracted IP address to an IP address provided by the remote telephony client to determine if they match. The extracted IP address and the provided IP address will not match if the remote telephony client is located on a private network. If the remote telephony client is located on a private network, the datagram generation module provides the extracted IP address and port number as the destination IP address and port number for sending each media datagram to the remote telephony client.

In one embodiment, the datagram generation module operates to extract the source port number from each of the media datagrams received from the remote client and provides the source port number extracted from the media datagram that was most recently received as the destination port number of each of the media datagrams sent to the remote telephony client. Further yet, the datagram generation module operates to extract the source IP address from each of the media datagrams received from the remote client and provides the source IP address extracted from the media datagram that was most recently received as the destination IP address of each of the media datagrams sent to the remote telephony client.

In a second embodiment, the datagram generation module operates to store, in a memory, the source IP address and source port number extracted from one of the media datagrams received from the remote telephony client, extract the source port number from media datagrams that are subsequently received from the remote telephony client, store an updated source port number in memory when an extracted source port number is different than the source port number previously stored in the memory, and provide the source IP address and source port number stored in memory as the destination IP address and destination port number for each of the media datagrams sent to the remote telephony client. Further yet, the datagram generation module operates to extract the source IP address from media diagrams that are subsequently received from the remote telephony client and store an updated source IP address in memory when an extracted IP address is different than the IP address previously stored in memory.

In a third embodiment, the datagram generation module operates to extract the source port number from each of the plurality of media datagrams received from the remote telephony client and provide the source port number extracted from one of the media datagrams that was received within a limited period of time prior to sending each media datagram as the destination port number of each of the media datagrams sent to the remote telephony client. Further yet, the datagram generation module may extract the source IP address from each of the plurality of media datagrams received from the remote telephony client and provide the source IP address extracted from one of the media datagram that was received within a limited period of time prior to sending each media datagram as the destination IP address of each of the media datagrams sent to the remote telephony client.

BRIEF DESCRIPTION OF THE DRAWINGS

FIG. 2 is a table representing data stored in a translation table of a network address translation server;

FIG. 4 is a flowchart representing exemplary operation of an Internet telephony

FIGS. 5a and 5b are flow charts representing exemplary operation of a media session module of an Internet telephony client in accordance with one aspect of this invention.

DESCRIPTION OF THE PREFERRED EMBODIMENTS

Figure 1:
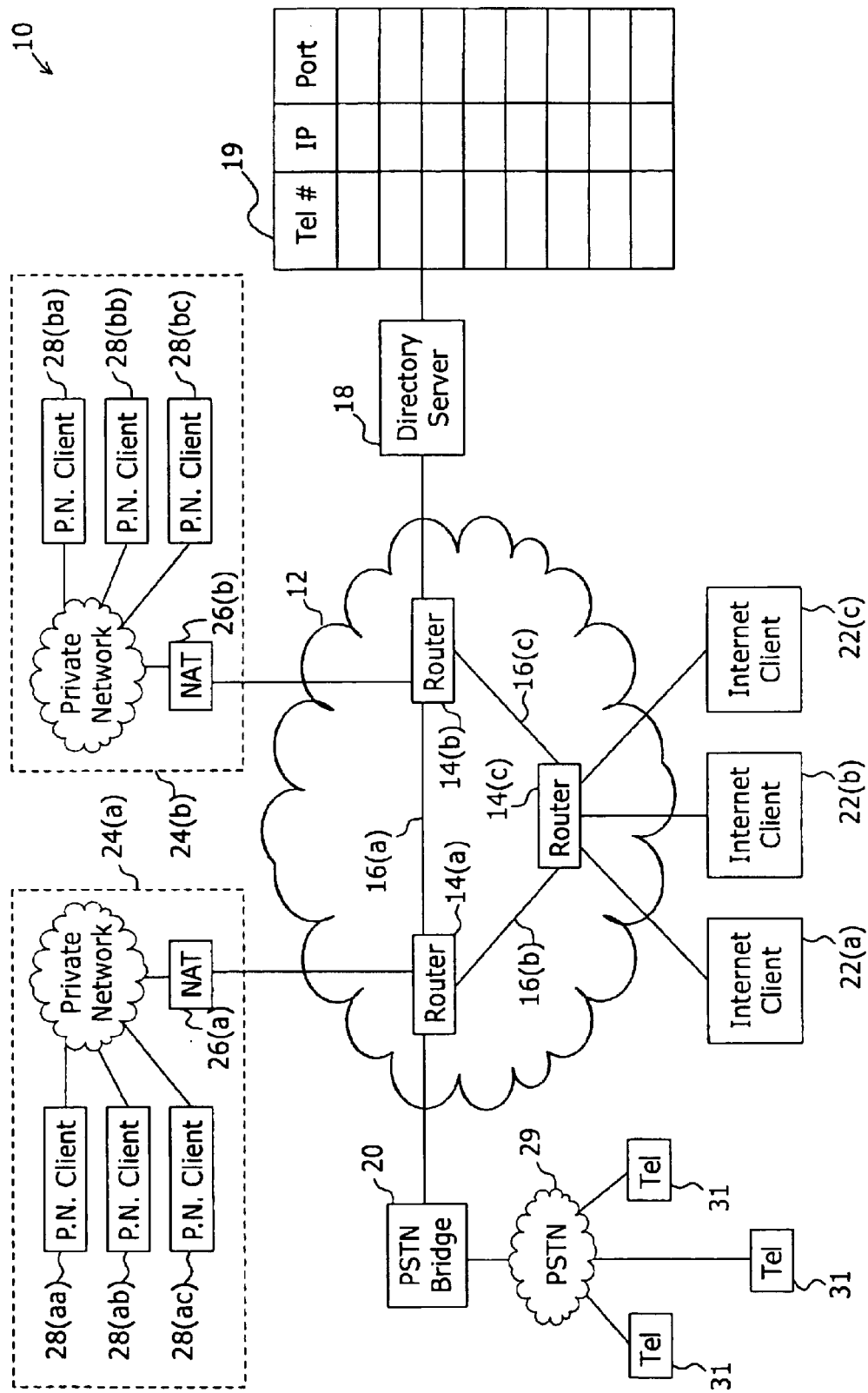
FIG. 1 is a block diagram of packet switched audio communication system utilizing the Internet.

The present invention will now be described in detail with reference to the drawings. In the drawings, like reference numerals are used to refer to like elements throughout.

FIG. 1 is a block diagram of a packet switched audio communication system 10 utilizing the Internet 12. The Internet 12 includes a plurality of routers 14(a)–14(c) interconnected by high speed data links 16(a)–16(c).

Coupled to the Internet 12, or more specifically coupled to one of the routers 14(a)–14(c), are various computing devices that, for purposes of this invention, include a directory server 18, a PSTN bridge 20, a plurality of Internet telephony clients 22(a) 22(c), and a plurality of network address translation (NAT) servers 26(a)–26(b).

Each of the computing devices coupled to the Internet 12 is assigned an Internet Protocol (IP) address. Frames of data are communicated between the various devices utilizing each devices IP address for routing the frames from a source device to a destination device. More specifically, a suite of protocols known as TCP/IP enables devices to set up TCP logical connections, and/or UDP logical channels, with each other utilizing each others IP address and logical port numbers for the purpose of exchanging data.

Each Internet client 22 is configured to initiate (e.g. place) and terminate (e.g. receive) peer to peer Internet telephony calls with other Internet clients 22. Such Internet clients 22 are also configured to terminate (e.g. receive) peer to peer Internet telephony calls that are initiated by a private network client 28 through its associated NAT server 26. However, because of NAT server 26 architecture (discussed later herein) Internet clients 22 can not initiate Internet telephony to a private network client 28.

To initiate an Internet telephony call, for example an Internet call initiated by Internet client 22(c) to Internet client 22(a), the initiating Internet client 22(c) signals the terminating Internet client 22(a).

One typical call signaling protocol is the International Telephony Union (ITU) Q.931 protocol and the H.245 protocol, which provide for the initiating Internet client 22(c) to set up one or more TCP/IP connections with the terminating Internet client 22(a) for the exchange of Q.931 call signaling messages and H.245 messages needed for setting up a media session. An alternative call signaling protocol is the Session Initiation Protocol (SIP) developed by the Internet Engineering Task Force (IETF) which provides for the initiating Internet client 22(c) and the terminating Internet client 22(a) to use UDP/IP logical channels to exchange call signaling messages and media session set up messages. It is envisioned that other systems may be utilized for call signaling and media session set up. For purposes of this invention, any system that provides for at. least the terminating Internet client 22(a) to provide a port number for receipt of media session datagrams to the initiating Internet client 22(c) will suffice.

After media session set. up messages are exchanged, each of the initiating Internet client 22(c) and the terminating Internet client 22(a) exchange compressed voice data utilizing real time protocol (RTP) media datagrams sent over UDP/IP logical channels to provide for a full duplex internet telephony conversation.

Because human operators are accustomed to working with 10-digit telephone numbers which, once assigned to a person, remain relatively stable and each Internet client 22 is addressed via a 12-digit IP address which may change each time the device logs onto an ISP network, the directory server 18 facilitates locating a desired client on the Internet for establishing internet telephony communications between the initiating Internet client 22(c) and the terminating Internet client 22(a). More specifically, the directory server 18 includes a mapping table 19 which correlates a 10-digit identification number which is permanently assigned to each Internet client 22 with the 12-digit IP address and port number which the Internet client 22 has most recently registered with the directory server 18 for receipt of Internet telephony calls.

In operation, the initiating Internet client 22(c) receives a 10-digit telephone number from the operator which identifies the terminating Internet client 22(a). Then, the initiating Internet client 22(c) opens a TCP/IP connection with the directory server 18 to determine the connection IP address and port number currently utilized by the terminating Internet client 22(a) for receipt of call signaling messages. Utilizing the IP address and port number obtained from the directory server 18, the initiating Internet client 22(c) is capable of opening the Q.931 call signaling connection, SIP call signaling channel, or other call signaling communication path with the terminating Internet client 22(*a*) without requiring the operator to input an IP address associated with the terminating Internet client 22(*a*).

Because it is desirable to provide for initiating a telephone call at an Internet client 22 and terminating the call at a traditional telephone device 31, the PSTN bridge 20 is provided for relaying relay audio data between a device on the Internet 12 and a traditional telephone device 31 coupled to the public switched telephone network (PSTN) 29. The PSTN bridge 20 operates as a telephony client in accordance with this invention for communicating audio data representing a telephone conversation with a remote telephony client via the Internet 12 and operates as a PSTN telephone for communicating audio data representing the telephone conversation with a remote telephone device 31 via the PSTN 29.

Each of the NAT servers 26(*a*) and 26(*b*) couples a private network 24(*a*) and 24(*b*) respectively, to one of the Internet 12 routers 14. Private network 24(*a*) includes a plurality of private network clients 28*aa*)–28(*ac*) coupled thereto and private network 24(*b*) includes a plurality of private network clients 28(*b*a)–28(*bc*) coupled thereto.

Each of the private networks 24(*a*) and 24(*b*) also utilizes the TCP/IP protocols. As such, each private network client 28 is assigned a "private network" IP address which is selected from a block of addresses reserved for private networks. Utilizing IP protocols, the private network client 28 can communicate data with other devices coupled to the private network 24 and with other computing devices on the Internet 12 through the NAT server 26.

More specifically, IP frames on the private network 24 are routed to the appropriate device on private network 24 when the destination address is within the block of private network IP addresses. When the destination IP address is a "real" IP address on the Internet, the IP frame on the private network 24 is routed to the NAT server 26. The NAT server 26 then emulates the destination device when communicating data over TCP/IP connections with the private network client 28 and operates as an IP layer proxy, by performing both address translation and port translation, to exchange data over TCP/IP connections with the destination device, on behalf of the private network client 28, over the Internet 12.

Further, a typical NAT server 26 is also capable of translating connectionless datagrams sent by the private network client 28 and forwarding such datagrams to the destination device over the Internet 12. And, if a connectionless datagram were to be responded to by the destination device and the response datagram is 1) received at the NAT server on the same port number as the NAT server utilized when translating the connectionless datagram; 2) includes a source IP address and port number which matches the destination IP address and port number of the connectionless datagram; and 3) received within a predefined time window following when the NAT server 26 sent the connectionless datagram, then the response datagram may be routed back to the private network client 28.

Referring briefly to FIG. 2 in conjunction with FIG. 1, a typical NAT server 26 maintains a translation table 30 which maps the source address and port number of the private network client 28 to the corresponding translated source address and port number for each TCP/IP connection opened and UDP/IP connectionless datagram sent by each private network client 28. Each entry 32(*a*)–32(*f*) in the table 30 corresponds to a single TCP/IP connection opened, or UDP/IP datagram sent, by one of the private network clients 28 and translated by the NAT server 26. Each entry 32(*a*)–32(*f*) includes data for mapping the source address and port number used by the private network client 28 in opening the connection (or sending the datagram) and the translated source address and port number used by the NAT server 26 for opening the proxy connection (or sending the datagram) with the destination device on the Internet 12. As such, the NAT server 26(*a*) utilizing this exemplary translation table 30 can relay a response frame received over the Internet (on the translated address and port number) back to the appropriate initiating private network client 28 on the appropriate port number.

For added security, each entry 32(*a*)–32(*f*) typically includes the destination IP address and port number to which the translated frame was sent over the Internet 12. As such, the NAT server 26 is capable of verifying that a frame addressed to the translated IP address and port number is truly a response frame from the device to which the translated frame was addressed.

Upon receipt of any frame from the Internet, the NAT server 26 will locate the one of the entries 32(*a*)–32(*f*) to which the frame corresponds utilizing the frames destination IP address and port number. The NAT server 26 will then verify that the frame is truly a response frame by comparing the frame's source address and port number with the destination IP address and port number in the corresponding one of the entries 32(*a*)–32(*f*). If there is a match, the NAT server 26 will generatea reverse translated frame and forward the reverse translated frame to the private network client 28 on the private network 24. The reverse translated frame is the same as the response frame except the destination IP address and port number are replaced with the initiating private network client 28 private network IP address and port number.

As such, private network clients 28 are similarly capable of initiating an Internet telephony call to any one of the Internet clients 22 through its associated private network 24 and NAT server 26.

More specifically, the operator of one of the private network clients, for example private network client 28*aa*) may initiate an Internet telephony call with a terminating Internet client, 22(*c*) for example, by entering the 10 digit telephone number associated with the Internet client 22(*a*).

The private network client 28*aa*) then opens a TCP/IP connection with the directory server 18, through NAT server 26(*a*), and obtains the connection IP address and port number currently used by the terminating Internet client 22(*c*) for receipt of call signaling. Thereafter, the private network client 28*aa*) is able to signal the terminating Internet client 22(*c*) utilizing the Q.931 call signaling TCP/IP connection or another connection based call signaling protocol.

However, it should be appreciated that even though the initiating private network client 28*aa*) is capable of establishing TCP/IP connections with the terminating Internet client 22(*a*) and is capable of sending media datagrams utilizing the IP address and port number of the terminating Internet client 22(*a*) as the UDP/IP logical channel, the terminating Internet client 22(*a*) can not send media datagrams to the IP address and port number designated by the private network client 28*aa*) for receipt of media datagrams.

More specifically, even though the private network client 28*aa*) may provide the terminating Internet client 22(*a*) with the private network client 28*aa*) IP address and port number for receipt of UDP/IP datagrams, UDPIIP datagrams which are sent by the terminating Internet client 22(*a*) will not be routed to the private network client 28(*aa*) because: 1) the IP address of the private network client 28*aa*) is within a block used only on private networks and is therefore not routable on the Internet 12; and 2) even if the UDPIIP datagram were to somehow be routable to the appropriate NAT server 26(*a*), the NAT server 26(*a*) will not have an entry in its translation table necessary for forwarding the frame to the private network client 28(*aa*). Therefore, as will be discussed in more detail herein, the media datagrams representing the media session must be communicated between the private network client 28(*aa*) and the terminating Internet client 22(*a*) on UDP channels which are extracted from a media datagram sent by the private network client 28(*aa*) to the terminating Internet client 22(*a*).

Figure 3:
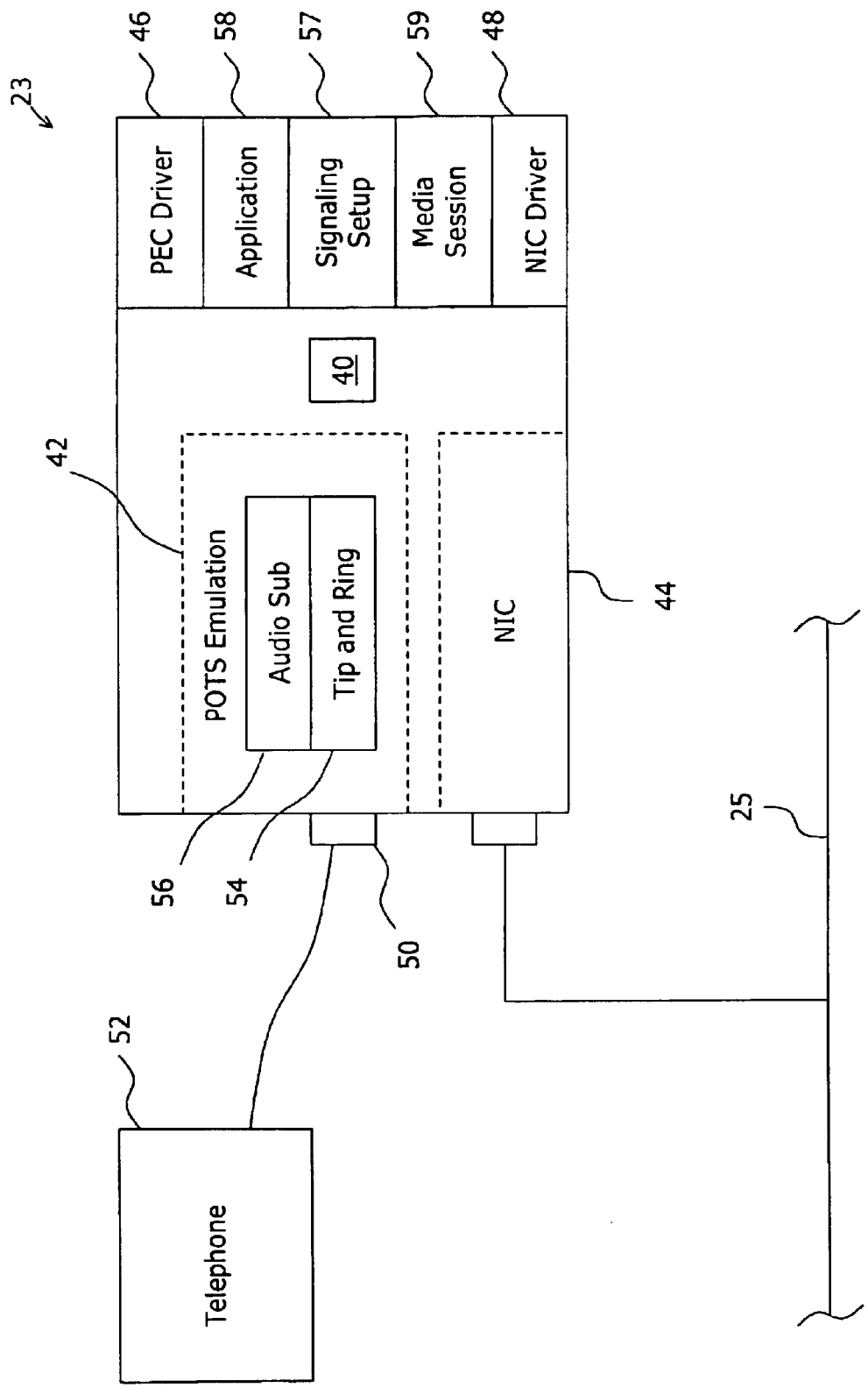
FIG. 3 is a block diagram of an Internet telephony client in accordance with one aspect of this invention.

Referring to FIG. 3, exemplary structure of a telephony client 23 in accordance with this invention is shown. The telephony client 23 is useful as both an Internet client 22 (FIG. 1) and as a private network client 28 (FIG. 1).

For purposes of this invention, the telephony client 23 may be a desk top computer which includes a processing unit 40 for operating a plain old telephone service (POTS) emulation circuit 42, a network interface circuit 44, a driver 46 for the POTS emulation circuit 42, a driver 48 for the network interface circuit 44, and an internet telephony application 58. Each of the POTS emulation circuit 42 and the network interface circuit 44 may be cards that plug into the computer expansion slots.

The POTS emulation circuit 42 includes an RJ-11 female jack 50 for coupling a traditional POTS telephone handset 52 to the emulation circuit 42. A tip and ring emulation circuit 54 emulates low frequency POTS signals on the tip and ring lines for operating the telephone handset 52. An audio system 56 interfaces the tip and ring emulation circuit 54 with the Internet telephony application 58. More specifically, the audio system 56 operates to digitize audio signals from the microphone in the handset 52 and present the digitized signals to the Internet telephony application 58, and simultaneously, operates to receive digital data representing audio signals from the internet telephony application 58 (representing the voice of the remote caller), convert the data to analog audio data, and present the analog audio data to the tip and ring emulation circuit 54. The tip and ring emulation circuit 54 modulates the tip and ring lines for diving the speaker of the handset 52 in accordance with the analog signal received from the audio system 56.

The internet telephony application 58 provides for the call signaling, the media session set up, and the media session exchange of compressed digital audio data with a remote telephony client. The Internet telephony application includes two general modules. The call signaling and media session set-up module 57 performs call signaling and the exchange of messages necessary to set up the media session.

Typically, the call signaling and set-up module 57 will include code for signaling and set up which are compliant with the Q.931 and H.245 protocols or other protocols widely used for call signaling and set up. The media session module 59 utilizes the call set up parameters established by the call signaling and set up module 57 for exchange of media datagrams representing the conversation between the operator of the telephony client 23 and the remote client.

The network interface circuit 44 and the network interface driver 48 together include the hardware and software circuits for operating the IP protocols and communicating frames of data over the network 25 with other devices coupled thereto.

While the above description of telephony client 23 references a desk top computer, other configurations of a telephony client 23 are envisioned by this invention and include an Internet telephony appliance which operates as a telephone with a is network interface and all of the above systems embedded therein.

Referring to the flowchart of FIG. 4 in conjunction with FIG. 3, steps performed by the Internet telephony application 58 in accordance with this invention are shown. Step 100 represents steps performed by the call signaling and set up module 57 and step 108 represents steps performed by the media session module 59.

In the exemplarily embodiment, step 100 includes sub-step 102 which represents opening a TCP/IP connection for the exchange of Q.931 call signaling messages with the remote client. In the case wherein the client 23 operating in accordance with this invention is initiating the internet telephony call to a remote client, the step represents initiating the TCP/IP connection utilizing either a well known port number for Q.931 connections or a port number obtained from the directory server 18 (FIG. 1). In the case wherein the client 23 operating in accordance with this invention is receiving the internet telephony call from a remote client, the step represents responding to the TCP/IP connection request as necessary to open the Q.931 connection.

Step 100 also includes sub step 104 which represents establishing a local IP address and port number for receiving connectionless media datagrams from the remote client during the media session and sub-step 105 which represents receiving from the remote client identification of its local IP address and designated port number for receiving media session datagrams. Sub-step 106 represents negotiating other media session parameters, such as compression capabilities, with the remote client such that both the client 23 and the remote client utilize the same parameters.

After the exchange of all call signaling and set up messages during step 100, the client 23 begins the media session at step 108. During the media session, media datagrams are sent from the client to the remote client and media datagrams are received by the client from the remote client such that a full duplex Internet telephony conversation may progress between the operator of the client and the operator of the remote client.

A previously discussed, if the initiating client is coupled to a private network and is located behind a NAT server, it may provide its local IP address and port number which it established for receipt of media datagrams. However, datagrams sent so such address and port number over the Internet will never actually reach the client.

Therefore, the media session module must provide for the datagrams to be sent on a unique IP address and port number routable to the client on the private network.

Figure 5B:
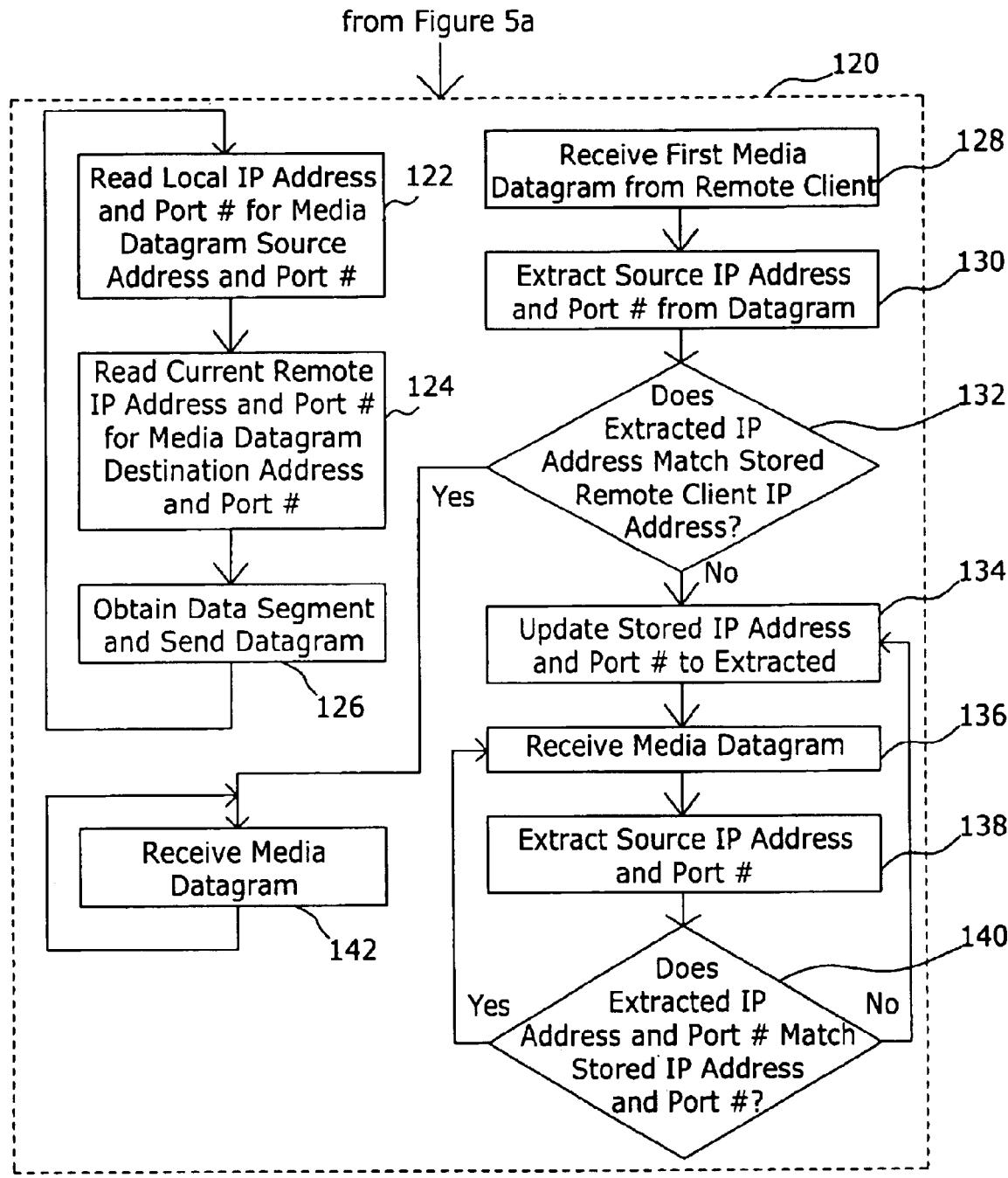

Referring to the flowcharts of FIGS. 5*a* and 5*b*, exemplary operation of the media session module 59 is set forth. Step 110 represents obtaining from the call signaling and set up module and storing in a memory the local IP address and port number utilized as the source address for sending the media datagrams to the remote client and step 112 represents obtaining and storing in memory the remote IP address and port number for use as the destination address for sending media datagrams to the remote client.

Step 114 represents obtaining and storing in memory the local IP address and port number for receiving media datagrams from the remote client. Step 116 then represents determining whether the local sending port number and the local receiving port number are the same. If they are not the same, the local sending port is closed at step 118 and the local receiving port is attached to the local sending port such that they are the same port.

It should be appreciated that if the client 23 is a private network client the media session module has an appropriate source IP address and port number and an appropriate destination IP address and port number for sending media datagrams to the remote client. However, if the client 23 is an Internet client and the remote client is on a private network, the destination IP address and port number provided by the remote private network client are un-routable and will not reach the remote private network client. Therefore, the following steps preformed during the exchange of media datagrams will locate a routable connectionless path to the remote private network client.

Step 120 represents the exchange or media datagrams. Step 120 includes both a sending string of sub-steps 122–126 and a receiving string of sub-steps 128–134. Both strings are simultaneously operating such that a full duplex conversation can be achieved.

Referring first to the sending string, step 122 represents reading the local IP address and port number from memory to obtain the source address for sending a media datagram and step 124 represents reading a current remote IP address and port number from memory to obtain the destination address and port number for sending a media datagram. Thereafter, step 126 represents compressing a segment of digital data to build a datagram and sending the media datagram utilizing the source address and destination address. Thereafter, this step repeats such that a sequence of media datagrams are sent representing the audio input of the operator of the client 23. Referring to the receiving string, step 128 represents receiving the first media datagram from the remote client and decompressing the digital data contained therein to obtain a segment of audio data for driving the speaker. Step 130 represents extracting the source IP address and port number from the received media datagram. If, at step 132, the extracted source IP address matches the stored remote client IP address it is determined that the remote client is not located behind a NAT server. Because the remote client is not located behind a NAT server, the system continues to receive each of a sequence of media datagrams at step 142 and decompress the digital data contained in each datagram to generate an analog audio data signal for driving the speaker.

Alternatively, if at step 132, the extracted source IP address does not match the stored remote client IP address, it is determined that the remote client is located behind a NAT server and the extracted IP address is the IP address of the NAT server. Therefore, at step 134 the system replaces the stored remote client IP address and port number with the extracted IP address and port number. As such, when the system reads the current remote IP address and port number (e.g. step 124),for sending a media datagram to the remote client, it will be reading the extracted source IP address and port number. Therefore, the datagram will be sent to the IP address and port number of the NAT server which, if received by the NAT server within a limited period of time following when the NAT server sent the datagram over the Internet to the client, will match an entry in the NAT server translation table and will be routed back to the remote private network client.

After the remote client IP address and port # stored in. memory are updated at step 134, the system proceeds to step 136 where another datagram is received from the remote client and the data contained therein is decompressed to generate another segment of audio data for driving the speaker.

Because the private network may contain two or more NAT servers and because each NAT server may utilize a different port number each time it translates a UDP/IP being sent from a private network client over the Internet, it is possible that the source IP address and/or source port number for each media datagram received by the client from the remote client may be different. As such, at step 138, the source IP address and source port number is extracted from the media datagram received at step 136. If the extracted IP address and port number match the remote client IP address and port number stored in memory at step 140, the system proceeds back to step 136 where another media datagram is received. Alternatively, if at step 140 it is determined that the extracted source IP address and/or port number to not match the remote client IP address and port number stored in memory, the system proceeds back to step 134 where the remote client IP address and port number stored in memory are updated to the most recently extracted IP address and port number.

It should be appreciated that in the event that the remote client is located behind a NAT server, the step of extracting the source IP address and port number from a received media datagram will identify the IP address of the NAT server and the port number of the NAT server which will be routed back to the remote private network client. Therefore, even though some initial media datagrams sent to the IP address and port number provided by the remote client may be un-routable and lost, once the IP address and port number are extracted and the memory updated, then media datagrams sent during the steps of the sending string 122–126 will be routed to the remote private network client provided the address and port number selected as "current" within step 124 is current within the limited period of time during which the NAT server leaves an entry open in its translation table.

More specifically, each media datagram will be routed because 1) it is being sent with a source IP address and port number which matches the destination IP address and port number used by the remote client for sending media datagrams; and 2) it is being sent with a destination IP address (NAT IP address) and port number (NAT port number) which matches an entry in the NAT translation table such that the media datagrams can be translated and routed to the remote private network client.

It should also be appreciated that in the event that the remote client is not located behind a NAT server and, as such, at step 132 the extracted IP address and the stored remote client IP address match, the client will utilize the port number provided by the remote client for sending datagrams to the remote client. As such, the system of this invention is compatible with systems which utilize different port numbers for sending datagrams and receiving datagrams during a media session such as standard H.323 systems utilizing H.245 call set up protocols.

It should be appreciated that the systems and methods of this invention provides for the ability to establish and maintain Internet telephony calls from a private network client behind a NAT server. Additionally, although the invention has been shown and described with respect to certain preferred embodiments, it Is obvious that equivalents and modifications will occur to others skilled in the art upon the reading and understanding of the specification. The present invention includes all such equivalents and modifications, and is limited only by the scope of the following claims.

What is claimed is:

1. A method of audio communication between a first and a second telephony client, the method comprising:

establishing a call signaling connection between the first telephony client located on a private network and the second telephony client on the Internet;

utilizing the call signaling connection to provide to the first telephony client an IP address and port number of the second telephony client for receipt of media datagrams from the first telephony client;

sending a plurality of media datagrams from the first telephony client to the second telephony client utilizing the IP address and port number of the second telephony client for receipt of media datagrams as the destination address and destination port number for each media datagram;

extracting a source IP address and source port number from at least one of the media datagrams received by the second telephony client;

sending at least one media datagram from the second telephony client to the first telephony client utilizing the extracted IP address and extracted port number as the destination address and port number for the at least one media datagram;

utilizing the IP address and port number of the second telephony client for receipt of media datagrams as the source address and source port number for the at least one media datagram sent from the second telephony client to the first telephony client; and wherein a plurality of media datagrams are sent from the second telephony client to the first telephony client, each of the plurality of media datagrams utilizing the extracted IP address and extracted port number which were extracted from the media datagram that was most recently received by the second telephony client as the destination address and destination port number.

2. A method of audio communication between a first and a second telephony client, the method comprising:

establishing a call signaling connection between the first telephony client located on a private network and the second telephony client on the Internet;

utilizing the call signaling connection to provide to the first telephony client an IP address and port number of the second telephony client for receipt of media datagrams from the first telephony client;

sending a plurality of media datagrams from the first telephony client to the second telephony client utilizing the IP address and port number of the second telephony client for receipt of media datagrams as the destination address and destination port number for each media datagram;

extracting a source IP address and source port number from at least one of the media datagrams received by the second telephony client;

sending at least one media datagram from the second telephony client to the first telephony client utilizing the extracted IP address and extracted port number as the destination address and port number for the at least one media datagram;

utilizing the IP address and port number of the second telephony client for receipt of media datagrams as the source address and source port number for the at least one media datagram sent from the second telephony client to the first telephony client; and wherein a plurality of media datagrams are sent from the second telephony client to the first telephony client, and the method further includes storing, in a memory, each extracted IP address and extracted port number, updating the memory each time at least one of a new IP address and new port number is extracted from a media datagram received by the second telephony client, and utilizing the IP address and port number stored in the memory as the destination IP address and port number for each of the media datagrams sent from the second telephony client to the first telephony client.

3. A method of audio communication between a first and a second telephony client, the method comprising:

establishing a call signaling connection between the first telephony client located on a private network and the second telephony client on the Internet;

utilizing the call signaling connection to provide to the first telephony client an IP address and port number of the second telephony client for receipt of media datagrams from the first telephony client;

sending a plurality of media datagrams from the first telephony client to the second telephony client utilizing the IP address and port number of the second telephony client for receipt of media datagrams as the destination address and destination port number for each media datagram;

extracting a source IP address and source port number from at least one of the media datagrams received by the second telephony client;

sending at least one media datagram from the second telephony client to the first telephony client utilizing the extracted IP address and extracted port number as the destination address and port number for the at least one media datagram;

utilizing the IP address and port number of the second telephony client for receipt of media datagrams as the source address and source port number for the at least one media datagram sent from the second telephony client to the first telephony client; and wherein a plurality of media datagrams are sent from the second telephony client to the first telephony client, each of the plurality of media datagrams utilizing the IP address extracted from at least one of the media datagrams received by the second telephony client and utilizing the port number extracted from the media datagram that was most recently received by the second telephony client as the destination IP address and destination port number.

4. A method of audio communication between a first and a second telephony client, the method comprising:

establishing a call signaling connection between the first telephony client located on a private network and the second telephony client on the Internet;

utilizing the call signaling connection to provide to the first telephony client an IP address and port number of the second telephony client for receipt of media datagrams from the first telephony client;

sending a plurality of media datagrams from the first telephony client to the second telephony client utilizing the IP address and port number of the second telephony client for receipt of media datagrams as the destination address and destination port number for each media datagram;

extracting a source IP address and source port number from at least one of the media datagrams received by the second telephony client;

sending at least one media datagram from the second telephony client to the first telephony client utilizing the extracted IP address and extracted port number as the destination address and port number for the at least one media datagram;

utilizing the IP address and port number of the second telephony client for receipt of media datagrams as the source address and source port number for the at least one media datagram sent from the second telephony client to the first telephony client; and wherein a plurality of media datagrams are sent from the second telephony client to the first telephony client and the method further includes storing, in a memory, the extracted IP address and extracted port number, updating the memory each time new port number is extracted from a media datagram received by the second telephony client, and utilizing the IP address and port number stored in the memory as the destination IP address and destination port number for each of the media datagrams sent from the second telephony client to the first telephony client.

5. A method of audio communication between a first and a second telephony client, the method comprising:

establishing a call signaling connection between the first telephony client located on a private network and the second telephony client on the Internet;

utilizing the call signaling connection to provide to the first telephony client an IP address and port number of the second telephony client for receipt of media datagrams from the first telephony client;

sending a plurality of media datagrams from the first telephony client to the second telephony client utilizing the IP address and port number of the second telephony client for receipt of media datagrams as the destination address and destination port number for each media datagram;

extracting a source IP address and source port number from at least one of the media datagrams received by the second telephony client;

sending at least one media datagram from the second telephony client to the first telephony client utilizing the extracted IP address and extracted port number as the destination address and port number for the at least one media datagram;

utilizing the IP address and port number of the second telephony client for receipt of media datagrams as the source address and source port number for the at least one media datagram sent from the second telephony client to the first telephony client; and wherein a plurality of media datagrams are sent from the second telephony client to the first telephony client, each of the plurality of media datagrams utilizing the extracted IP address and extracted port number that are extracted from one of the media datagrams received by the second telephony client within a limited period of time prior to sending the media datagram as the destination IP address and destination port number.

6. A method of audio communication between a first and a second telephony client, the method comprising:

establishing a call signaling connection between the first telephony client located on a private network and the second telephony client on the Internet;

utilizing the call signaling connection to provide to the first telephony client an IP address and port number of the second telephony client for receipt of media datagrams from the first telephony client;

sending a plurality of media datagrams from the first telephony client to the second telephony client utilizing the IP address and port number of the second telephony client for receipt of media datagrams as the destination address and destination port number for each media datagram;

extracting a source IP address and source port number from at least one of the media datagrams received by the second telephony client;

sending at least one media datagram from the second telephony client to the first telephony client utilizing the extracted IP address and extracted port number as the destination address and port number for the at least one media datagram;

utilizing the IP address and port number of the second telephony client for receipt of media datagrams as the source address and source port number for the at least one media datagram sent from the second telephony client to the first telephony client; and wherein a plurality of media datagrams are sent from the second telephony client to the first telephony client, and the method further includes storing the extracted IP address and extracted port number in a memory, storing an updated IP address and updated port number in memory when at least one of a different IP address and different port number is extracted from a media datagram received by the second telephony client, and utilizing an IP address and port number stored in the memory within a limited period of time prior to sending each media datagram as the destination IP address and destination port number for each of the media datagrams sent from the second telephony client to the first telephony client.

7. A method of audio communication between a first and a second telephony client, the method comprising:

establishing a call signaling connection between the first telephony client located on a private network and the second telephony client on the Internet;

utilizing the call signaling connection to provide to the first telephony client an IP address and port number of the second telephony client for receipt of media datagrams from the first telephony client;

sending a plurality of media datagrams from the first telephony client to the second telephony client utilizing the IP address and port number of the second telephony client for receipt of media datagrams as the destination address and destination port number for each media datagram;

extracting a source IP address and source port number from at least one of the media datagrams received by the second telephony client;

sending at least one media datagram from the second telephony client to the first telephony client utilizing the extracted IP address and extracted port number as the destination address and port number for the at least one media datagram;

utilizing the IP address and port number of the second telephony client for receipt of media datagrams as the source address and source port number for the at least one media datagram sent from the second telephony client to the first telephony client; and wherein a plurality of media datagrams are sent from the second telephony client to the first telephony client, each of the plurality of media datagrams utilizing the extracted IP address extracted from at least one of the media datagrams received by the second telephony client and utilizing the port number extracted from one of the media datagrams received by the second telephony client within a limited period of time prior to sending each of the plurality of media datagrams as the destination IP address and destination port number for each of the plurality of media datagrams sent from the second telephony client to the first telephony client.

8. A method of audio communication between a first and a second telephony client, the method comprising:

establishing a call signaling connection between the first telephony client located on a private network and the second telephony client on the Internet;

utilizing the call signaling connection to provide to the first telephony client an IP address and port number of the second telephony client for receipt of media datagrams from the first telephony client;

sending a plurality of media datagrams from the first telephony client to the second telephony client utilizing the IP address and port number of the second telephony client for receipt of media datagrams as the destination address and destination port number for each media datagram;

extracting a source IP address and source port number from at least one of the media datagrams received by the second telephony client;

sending at least one media datagram from the second telephony client to the first telephony client utilizing the extracted IP address and extracted port number as the destination address and port number for the at least one media datagram;

utilizing the IP address and port number of the second telephony client for receipt of media datagrams as the source address and source port number for the at least one media datagram sent from the second telephony client to the first telephony client; and wherein a plurality of media datagrams are sent from the second telephony client to the first telephony client, and the method further includes storing the extracted IP address and extracted port number in a memory, storing an updated port number in memory when a different port number is extracted from a media datagram received by the second telephony client, and utilizing the IP address and port number stored within a limited period of time prior to sending each media datagram as the destination IP address and destination port number for each of the plurality of media datagrams sent from the second telephony client to the first telephony client.

9. A method of audio communication between a first and a second telephony client, the method comprising:

communicating from the second telephony client to the first telephony client an IP address and port number of the second telephony client for receipt of media datagrams from the first telephony client;

sending a media datagram from the first telephony client to the second telephony client utilizing the IP address and port number for receipt of media datagrams as the destination IP address and destination port number for the media datagram;

extracting the source IP address and source port number from the media datagram;

sending a media datagram from the second telephony client to the first telephony client utilizing the extracted IP address and extracted port number as the destination address and port number;

utilizing the IP address and port number of the second telephony client for receipt of media datagrams from the first telephony client as the source address and source port number for the media datagram sent from the second telephony client to the first telephony client; and wherein a plurality of media datagrams are sent from the first telephony client to the second telephony client and a plurality of media datagrams are sent from the second telephony client to the first telephony client, and the method further includes extracting the source port number from each of the plurality of media datagrams sent from the first telephony client to the second telephony client and, utilizing the source port number extracted from the media datagram that was most recently received by the second telephony client as the destination port number of each of the plurality of media datagrams sent from the second telephony client to the first telephony client.

10. The method of claim 9, further including extracting the source IP address from each of the plurality of media datagrams sent from the first telephony client to the second telephony client and, utilizing the source IP address extracted from the media datagram that was most recently received by the second telephony client as the destination IP address of each of the plurality of media datagrams sent from the second telephony client to the first telephony client.

11. A method of audio communication between a first and a second telephony client, the method comprising:

communicating from the second telephony client to the first telephony client an IP address and port number of the second telephony client for receipt of media datagrams from the first telephony client;

sending a media datagram from the first telephony client to the second telephony client utilizing the IP address and port number for receipt of media datagrams as the destination IP address and destination port number for the media datagram;

extracting the source IP address and source port number from the media datagram; sending a media datagram from the second telephony client to the first telephony client utilizing the extracted IP address and extracted port number as the destination address and port number;

utilizing the IP address and port number of the second telephony client for receipt of media datagrams from the first telephony client as the source address and source port number for the media datagram sent from the second telephony client to the first telephony client; and wherein a plurality of media datagrams are sent from the first telephony client to the second telephony client and a plurality of media datagrams are sent from the second telephony client to the first telephony client and the method further includes storing, in a memory, the source IP address and source port number from one of the media datagrams sent from the first telephony client to the second telephony client, extracting the source port number from media datagrams subsequently received by the second telephony client, storing an updated source port number in memory when an extracted source port number is different than the source port number stored in the memory, and utilizing the source IP address and source port number stored in memory as the destination IP address and destination port number for each of the plurality of media datagrams sent from the second telephony client to the first telephony client.

12. The method of claim 11, further including extracting the source IP address from the media diagrams subsequently received by the second telephony client and storing an updated source IP address in memory when an extracted IP address is different than the IP address stored in memory.

13. A method of audio communication between a first and a second telephony client, the method comprising:

communicating from the second telephony client to the first telephony client an IP address and port number of the second telephony client for receipt of media datagrams from the first telephony client;

sending a media datagram from the first telephony client to the second telephony client utilizing the IP address and port number for receipt of media datagrams as the destination IP address and destination port number for the media datagram;

extracting the source IP address and source port number from the media datagram;

sending a media datagram from the second telephony client to the first telephony client utilizing the extracted IP address and extracted port number as the destination address and port number;

utilizing the IP address and port number of the second telephony client for receipt of media datagrams from the first telephony client as the source address and source port number for the media datagram sent from the second telephony client to the first telephony client; and wherein a plurality of media datagrams are sent from the first telephony client to the second telephony client and a plurality of media datagrams are sent from the second telephony client to the first telephony client and the method further includes, extracting the source port number from each of the plurality of media datagrams sent from the first telephony client to the second telephony client and, utilizing the source port number extracted from a media datagram received by the second telephony client within a limited period of time prior to sending each media datagram as the destination port number of each of the media datagrams sent from the second telephony client to the first telephony client.

14. The method of claim 13, further including extracting the source IP address from each of the plurality of media datagrams sent from the first telephony client to the second telephony client and, utilizing the source IP address extracted from a media datagram received by the second telephony client within a limited period of time prior to sending each media datagram as the destination IP address of each of the media datagrams sent from the second telephony client to the first telephony client.

15. A method of communicating audio data with a remote telephony client, the method comprising:

establishing a port number for receipt of media datagrams from the remote telephony client and communicating such port number to the remote telephony client;

receiving a media datagram from the remote telephony client on the established port number;

extracting the source IP address and source port number from the received media datagram;

sending a media datagram to the remote telephony client utilizing the extracted source IP address and source port number as the destination IP address and destination port number of the media datagram sent to the remote telephony client;

utilizing the port number established for receipt of media datagrams from the remote telephony client as the source port number for sending media datagrams to the remote telephony client; and wherein a plurality of media datagrams are sent to the remote telephony client and a plurality of media datagrams are received from the remote telephony client and the method further includes, extracting the source port number from each of the plurality of media datagrams received from the remote telephony client and utilizing the source port number extracted from the media datagram most recently received as the destination port number for each of the plurality of media datagrams sent to the remote telephony client.

16. The method of claim 15, further including extracting the source IP address from each of the plurality of media datagrams received from the remote telephony client and utilizing the source IP address extracted from the media datagram most recently received as the destination IP address for each of the plurality of media datagrams sent to the remote telephony client.

17. A method of communicating audio data with a remote telephony client, the method comprising:

establishing a port number for receipt of media datagrams from the remote telephony client and communicating such port number to the remote telephony client;

receiving a media datagram from the remote telephony client on the established port number;

extracting the source IP address and source port number from the received media datagram;

sending a media datagram to the remote telephony client utilizing the extracted source IP address and source port number as the destination IP address and destination port number of the media datagram sent to the remote telephony client;

utilizing the port number established for receipt of media datagrams from the remote telephony client as the source port number for sending media datagrams to the remote telephony client; and wherein a plurality of media datagrams are sent to the remote telephony client and a plurality of media datagrams are received from the remote telephony client and the method further includes storing, in a memory, the source IP address and source port number extracted from one of the media datagrams received from the remote telephony client, extracting the source port number from media datagrams that are subsequently received from the remote telephony client, storing an updated source port number in memory when an extracted source port number is different than the source port number stored in the memory, and utilizing the source IP address and source port number stored in memory as the destination IP address and destination port number for each of the plurality of media datagrams sent to the remote telephony client.

18. The method of claim 17, further including extracting the source IP address from media datagrams that are subsequently received from the remote telephony client and storing an updated source IP address in memory when an extracted IP address is different than the IP address stored in memory.

19. A method of communicating audio data with a remote telephony client, the method comprising:

establishing a port number for receipt of media datagrams from the remote telephony client and communicating such port number to the remote telephony client;

receiving a media datagram from the remote telephony client on the established port number;

extracting the source IP address and source port number from the received media datagram;

sending a media datagram to the remote telephony client utilizing the extracted source IP address and source port number as the destination IP address and destination port number of the media datagram sent to the remote telephony client;

utilizing the port number established for receipt of media datagrams from the remote telephony client as the source port number for sending media datagrams to the remote telephony client; and wherein a plurality of media datagrams are sent to the remote telephony client and a plurality of media datagrams are received from the remote telephony client and the method further includes, extracting the source port number from each of the plurality of media datagrams received from the remote telephony client and utilizing the source port number extracted from a media datagram received within a limited period of time prior to sending each media datagram as the destination port number of each of the media datagrams sent to the remote telephony client.

20. The method of claim 19, further including extracting the source IP address from each of the plurality of media datagrams received from the remote telephony client and utilizing the source IP address extracted a media datagram received within a limited period of time prior to sending each media datagram as the destination IP address of each of the media datagrams sent to the remote telephony client.

21. A method of communicating audio data with a remote telephony client, the method comprising:

a) establishing a port number for receipt of media datagrams from the remote telephony client and communicating such port number to the remote telephony client;

b) receiving from the remote telephony client identification of an IP address and port number to utilize for sending media datagrams to the remote telephony client and storing the identified IP address and identified port number in a memory;

c) sending a plurality of media datagrams to the remote telephony client utilizing the IP address and port number most recently stored in the memory as the destination IP address and destination port number for each of the plurality of media datagrams;

d) receiving a plurality of media datagrams from the remote telephony client on the established port number and extracting the source IP address and source port number from each of the received media datagrams; and e) storing an updated IP address and updated port number in the memory each time at least one of an extracted IP address and extracted port number does not match the IP address and port number stored in the memory.

22. The method of claim 21, further including utilizing the port number established for receipt of media datagrams from the remote telephony client as the source port number of each of the media datagrams sent to the remote telephony client.

23. A telephony client comprising:

a network interface circuit for sending media datagrams to a remote telephony client and for receiving media datagrams from the remote telephony client;

an audio interface system for converting a media datagram received from the remote telephony client to analog audio data for driving a speaker and for converting analog audio data from a microphone to a media datagram for sending to the remote telephony client;

a datagram generation module providing a destination IP address and port number for sending the media datagram to the remote telephony client, the datagram generation module operating to extract the source IP address and source port number from the media datagram received from the remote telephony client and provide the extracted IP address and port number as the destination IP address and port number for sending the media datagram to the remote telephony client;

wherein the datagram generation module further provides a source port number for sending the media datagram to the remote telephony client, the source port number being the same port number on which media datagram is received from the remote telephony client; and wherein the audio interface circuit converts analog audio data from the microphone to a sequence of media datagrams for sending to the remote telephony client and converts a sequence of media datagrams received from the remote telephony client to analog audio data for driving the speaker, and the datagram generation module operates to extract the source port number from each of the sequence of media datagrams received from the remote telephony client and provides the source port number extracted from the media datagram that was most recently received as the destination port number for each of the sequence of media datagrams sent to the remote telephony client.

24. The telephony client of claim 23, wherein the datagram generation module further operates to extract the source IP address from each of the sequence of media datagrams received from the remote telephony client and provides the source IP address extracted from the media datagram that was most recently received as the destination IP address for each of the sequence of media datagrams sent to the remote telephony client.

25. A telephony client comprising:

a network interface circuit for sending media datagrams to a remote telephony client and for receiving media datagrams from the remote telephony client;

an audio interface system for converting a media datagram received from the remote telephony client to analog audio data for driving a speaker and for converting analog audio data from a microphone to a media datagram for sending to the remote telephony client;

a datagram generation module providing a destination IP address and port number for sending the media datagram to the remote telephony client, the datagram generation module operating to extract the source IP address and source port number from the media datagram received from the remote telephony client and provide the extracted IP address and port number as the destination IP address and port number for sending the media datagram to the remote telephony client;

wherein the datagram generation module further provides a source port number for sending the media datagram to the remote telephony client, the source port number being the same port number on which media datagram is received from the remote telephony client; and wherein the audio interface circuit converts analog audio data from the microphone to a sequence of media datagrams for sending to the remote telephony client and converts a sequence of media datagrams received from the remote telephony client to analog audio data for driving the speaker, and the datagram generation module operates to store, in a memory, the source IP address and source port number from one of the media datagrams received from the remote telephony client, extract the source port number from media datagrams that are subsequently received, store an updated source port number in memory when an extracted source port number from a subsequently received media datagram is different than the source port number stored in the memory, and provide the source IP address and source port number stored in memory as the destination IP address and destination port number for each of the sequence of media datagrams sent to the remote telephony client.

26. The telephony client of claim 25, wherein the datagram generation module further operates to extract the source IP address media diagrams that are subsequently received and store an updated source IP address in memory when an IP address extracted from a subsequently received media datagram is different than the IP address stored in memory.

27. A telephony client comprising:

a network interface circuit for sending media datagrams to a remote telephony client and for receiving media data-rams from the remote telephony client;

an audio interface system for converting a media datagram received from the remote telephony client to analog audio data for driving a speaker and for converting analog audio data from a microphone to a media datagram for sending to the remote telephony client;

a datagram generation module providing a destination IP address and port number for sending the media datagram to the remote telephony client, the datagram generation module operating to extract the source IP address and source port number from the media datagram received from the remote telephony client and provide the extracted IP address and port number as the destination IP address and port number for sending the media datagram to the remote telephony client;

wherein the datagram generation module further provides a source port number for sending the media datagram to the remote telephony client, the source port number being the same port number on which media datagram is received from the remote telephony client; and wherein the audio interface circuit converts analog audio data from the microphone to a sequence of media datagrams for sending to the remote telephony client and converts a sequence of media datagrams received from the remote telephony client to analog audio data for driving the speaker, and the datagram generation module operates to extract the source port number from each of the sequence of media datagrams received from the remote telephony client and provide the source port number extracted from one of the media datagrams that was received within a limited period of time prior to sending each media datagram as the destination port number for each media datagram sent to the remote telephony client.

28. The telephony client of claim 27, wherein the datagram generation module further extracts the source IP address from each of the sequence of media datagrams received from the remote telephony client and provides the source IP address extracted from one of the media datagram that was received within a limited period of time prior to sending each media datagram as the destination IP address number for each media datagram sent to the remote telephony client.

29. A telephony client comprising:

a) a network interface circuit for sending media datagrams to a remote telephony client and for receiving media datagrams from the remote telephony client on the same port number;

b) an audio interface system for converting a sequence of media datagrams received from the remote telephony client to analog audio data for driving a speaker and for converting analog audio data from a microphone to a sequence of media datagrams for sending to the remote telephony client;

c) a datagram generation module providing a destination IP address and port number for sending each media datagram to the remote telephony client, the datagram generation module operating to:
  (i) establish a port number for receipt of media datagrams from the remote telephony client and communicate such port number to the remote telephony client;
  (ii) receive from the remote telephony client identification of an IP address and port number to utilize for sending media datagrams to the remote telephony client and store the identified IP address and identified port number in a memory;
  (iii) provide the IP address and port number most recently stored in the memory as the destination IP address and destination port number for each of the media datagrams sent to the remote telephony client;
  (iv) extract the source IP address and source port number from each of the media datagrams received from the remote telephony client; and
  (v) store an updated IP address and updated port number in the memory each time at least one of an extracted IP address and extracted port number does not match the IP address and port number stored in the memory.

30. A telephony client comprising:

a) a network interface circuit for sending media datagrams to a remote telephony client and for receiving media datagrams from the remote telephony client on the same port number;

b) an audio interface system for converting a sequence of media datagrams received from the remote telephony client to analog audio data for driving a speaker and for converting analog audio data from a microphone to a sequence of media datagrams for sending to the remote telephony client;

c) a datagram generation module providing a destination IP address and port number for sending each media datagram to the remote telephony client, the datagram generation module operating to:
  (i) establish a port number for receipt of media datagrams from the remote telephony client and communicate such port number to the remote telephony client;
  (ii) receive from the remote telephony client identification of an IP address and port number to utilize for sending media datagrams to the remote telephony client and store the identified IP address and identified port number in a memory;
  (iii) provide the IP address and port number most recently stored in the memory as the destination IP address and destination port number for each of the media datagrams sent to the remote telephony client;

(iv) extract the source IP address from at least one media datagram received from the remote telephony client and extract the source port number from each of the media datagrams received from the remote telephony client; and (v) update at least one of the IP address and port number stored in the memory if at least one of the extracted IP address and extracted port number does not match the IP address and port number stored in the memory.

31. A method of audio communication between a first and a second telephony client, the method comprising:

communicating from the second telephony client to the first telephony client an IP address and port number of the second telephony client for receipt of media datagrams from the first telephony client;

communicating from the first telephony client to the second telephony client an IP address and port number of the first telephony client for receipt of media datagrams from the second telephony client;

sending a media datagram from the first telephony client to the second telephony client utilizing the IP address and port number for receipt of media datagrams by the second telephony client as the destination IP address and destination port number for the media datagram;

extracting the source IP address and source port number from the media datagram;

sending a media datagram from the second telephony client to the first telephony client utilizing the IP address and port number communicated from the first telephony client to the second telephony client for receipt of media datagrams as the destination IP address and port number if the extracted source IP address and the IP address communicated from the first telephony client to the second telephony client are the same;

sending a media datagram from the second telephony client to the first telephony client utilizing the extracted IP address and extracted port number as the destination address and port number if the extracted source IP address and the IP address communicated from the first telephony client to the second telephony client are not the same;

utilizing the IP address and port number of the second telephony client for receipt of media datagrams from the first telephony client as the source address and source port number for the media datagram sent from the second telephony client to the first telephony client; and wherein a plurality of media datagrams are sent from the first telephony client to the second telephony client and a plurality of media datagrams are sent from the second telephony client to the first telephony client and, if the extracted source IP address and the IP address communicated from the first telephony client to the second telephony client are not the same, then the method further includes extracting the source port number from each of the plurality of media datagrams sent from the first telephony client to the second telephony client and, utilizing the source port number extracted from the media datagram that was most recently received by the second telephony client as the destination port number of each of the plurality of media datagrams sent from the second telephony client to the first telephony client.

32. The method of claim 31, further including extracting the source IP address from each of the plurality of media datagrams sent from the first telephony client to the second telephony client and, utilizing the source IP address extracted from the media datagram that was most recently received by the second telephony client as the destination IP address of each of the plurality of media datagrams sent from the second telephony client to the first telephony client.

33. A method of audio communication between a first and a second telephony client, the method comprising:

communicating from the second telephony client to the first telephony client an IP address and port number of the second telephony client for receipt of media datagrams from the first telephony client;

communicating from the first telephony client to the second telephony client an IP address and port number of the first telephony client for receipt of media datagrams from the second telephony client;

sending a media datagram from the first telephony client to the second telephony client utilizing the IP address and port number for receipt of media datagrams by the second telephony client as the destination IP address and destination port number for the media datagram;

extracting the source IP address and source port number from the media datagram;

sending a media datagram from the second telephony client to the first telephony client utilizing the IP address and port number communicated from the first telephony client to the second telephony client for receipt of media datagrams as the destination IP address and port number if the extracted source IP address and the IP address communicated from the first telephony client to the second telephony client are the same;

sending a media datagram from the second telephony client to the first telephony client utilizing the extracted IP address and extracted port number as the destination address and port number if the extracted source IP address and the IP address communicated from the first telephony client to the second telephony client are not the same;

utilizing the IP address and port number of the second telephony client for receipt of media datagrams from the first telephony client as the source address and source port number for the media datagram sent from the second telephony client to the first telephony client; and wherein a plurality of media datagrams are sent from the first telephony client to the second telephony client and a plurality of media datagrams are sent from the second telephony client to the first telephony client and, if the extracted source IP address and the IP address communicated from the first telephony client to the second telephony client are not the same, the method further includes storing, in a memory, the source IP address and source port number from one of the media datagrams sent from the first telephony client to the second telephony client, extracting the source port number from media datagrams subsequently received by the second telephony client, storing an updated source port number in memory when an extracted source port number is different than the source port number stored in the memory, and utilizing the source IP address and source port number stored in memory as the destination IP address and destination port number for each of the plurality of media datagrams sent from the second telephony client to the first telephony client.

34. The method of claim 33, further including extracting the source IP address from the media diagrams subsequently received by the second telephony client and storing an updated source IP address in memory when an extracted IP address is different than the IP address stored in memory.

35. A method of audio communication between a first and a second telephony client, the method comprising:
communicating from the second telephony client to the first telephony client an IP address and port number of the second telephony client for receipt of media datagrams from the first telephony client;
communicating from the first telephony client to the second telephony client an IP address and port number of the first telephony client for receipt of media datagrams from the second telephony client;
sending a media datagram from the first telephony client to the second telephony client utilizing the IP address and port number for receipt of media datagrams by the second telephony client as the destination IP address and destination port number for the media datagram;
extracting the source IP address and source port number from the media datagram;
sending a media datagram from the second telephony client to the first telephony client utilizing the IP address and port number communicated from the first telephony client to the second telephony client for receipt of media datagrams as the destination IP address and port number if the extracted source IP address and the IP address communicated from the first telephony client to the second telephony client are the same;
sending a media datagram from the second telephony client to the first telephony client utilizing the extracted IP address and extracted port number as the destination address and port number if the extracted source IP address and the IP address communicated from the first telephony client to the second telephony client are not the same;
utilizing the IP address and port number of the second telephony client for receipt of media datagrams from the first telephony client as the source address and source port number for the media datagram sent from the second telephony client to the first telephony client; and
wherein a plurality of media datagrams are sent from the first telephony client to the second telephony client and a plurality of media datagrams are sent from the second telephony client to the first telephony client and, if the extracted source IP address and the IP address communicated from the first telephony client to the second telephony client are not the same, the method further includes, extracting the source port number from each of the plurality of media datagrams sent from the first telephony client to the second telephony client and, utilizing the source port number extracted from a media datagram received by the second telephony client within a limited period of time prior to sending each media datagram as the destination port number of each of the media datagrams sent from the second telephony client to the first telephony client.

36. The method of claim 35, further including extracting the source IP address from each of the plurality of media datagrams sent from the first telephony client to the second telephony client and, utilizing the source IP address extracted from a media datagram received by the second telephony client within a limited period of time prior to sending each media datagram as the destination IP address of each of the media datagrams sent from the second telephony client to the first telephony client.

37. A method of communicating audio data with a remote telephony client, the method comprising:
establishing a port number for receipt of media datagrams from the remote telephony client and communicating such port number to the remote telephony client;
receiving from the remote telephony client identification of an IP address and port number established by the remote telephony client for receipt of media datagrams;
receiving a media datagram from the remote telephony client on the established port number extracting the source IP address and source port number from the received media datagram;
sending a media datagram to the remote telephony client utilizing the IP address and port number identified by the remote telephony client as the destination IP address and destination port number of the media datagram sent to the remote telephony client if the extracted source IP address matches the identified IP address;
sending a media datagram to the remote telephony client utilizing the extracted source IP address and source port number as the destination IP address and destination port number of the media datagram sent to the remote telephony client if the extracted source IP address does not match the identified IP address:
utilizing the port number established for receipt of media datagrams from the remote telephony client as the source port number for sending media datagrams to the remote telephony client; and
wherein a plurality of media datagrams are sent to the remote telephony client and a plurality of media datagrams are received from the remote telephony client and, if the extracted source IP address does not match the identified IP address, the method further includes, extracting the source port number from each of the plurality of media datagrams received from the remote telephony client and utilizing the source port number extracted from the media datagram most recently received as the destination port number for each of the plurality of media datagrams sent to the remote telephony client.

38. The method of claim 37, further including extracting the source IP address from each of the plurality of media datagrams received from the remote telephony client and utilizing the source IP address extracted from the media datagram most recently received as the destination IP address for each of the plurality of media datagrams sent to the remote telephony client.

39. A method of communicating audio data with a remote telephony client, the method comprising:
establishing a port number for receipt of media datagrams from the remote telephony client and communicating such port number to the remote telephony client;
receiving from the remote telephony client identification of an IP address and port number established by the remote telephony client for receipt of media datagrams;
receiving a media datagram from the remote telephony client on the established port number;
extracting the source IP address and source port number from the received media datagram;
sending a media datagram to the remote telephony client utilizing the IP address and port number identified by the remote telephony client as the destination IP address and destination port number of the media datagram sent to the remote telephony client if the extracted source IP address matches the identified IP address;

sending a media datagram to the remote telephony client utilizing the extracted source IP address and source port number as the destination IP address and destination port number of the media datagram sent to the remote telephony client if the extracted source IP address does not match the identified IP address;

utilizing the port number established for receipt of media datagrams from the remote telephony client as the source port number for sending media datagrams to the remote telephony client; and wherein a plurality of media datagrams are sent to the remote telephony client and a plurality of media datagrams are received from the remote telephony client and, if the extracted source IP address does not match the identified IP address, the method further includes storing, in a memory, the source IP address and source port number extracted from one of the media datagrams received from the remote telephony client, extracting the source port number from media datagrams that are subsequently received from the remote telephony client, storing an updated source port number in memory when an extracted source port number is different than the source port number stored in the memory, and utilizing the source IP address and source port number stored in memory as the destination IP address and destination port number for each of the plurality of media datagrams sent to the remote telephony client.

40. The method of claim 39, further including extracting the source IP address from media datagrams that are subsequently received from the remote telephony client and storing an updated source IP address in memory when an extracted IP address is different than the IP address stored in memory.

41. A method of communicating audio data with a remote telephony client, the method comprising:

establishing a port number for receipt of media datagrams from the remote telephony client and communicating such port number to the remote telephony client;

receiving from the remote telephony client identification of an IP address and port number established by the remote telephony client for receipt of media datagrams;

receiving a media datagram from the remote telephony client on the established port number;

extracting the source IP address and source port number from the received media datagram;

sending a media datagram to the remote telephony client utilizing the IP address and port number identified by the remote telephony client as the destination IP address and destination port number of the media datagram sent to the remote telephony client if the extracted source IP address matches the identified IP address;

sending a media datagram to the remote telephony client utilizing the extracted source IP address and source port number as the destination IP address and destination port number of the media datagram sent to the remote telephony client if the extracted source IP address does not match the identified IP address; utilizing the port number established for receipt of media datagrams from the remote telephony client as the source port number for sending media datagrams to the remote telephony client; and wherein a plurality of media datagrams are sent to the remote telephony client and a plurality of media datagrams are received from the remote telephony client and, if the extracted source IP address does not match the identified IP address, the method further includes extracting the source port number from each of the plurality of media datagrams received from the remote telephony client and utilizing the source port number extracted from a media datagram received within a limited period of time prior to sending each media datagram as the destination port number of each of the media datagrams sent to the remote telephony client.

42. The method of claim 41, further including extracting the source IP address from each of the plurality of media datagrams received from the remote telephony client and utilizing the source IP address extracted a media datagram received within a limited period of time prior to sending each media datagram as the destination IP address of each of the media datagrams sent to the remote telephony client.

43. A telephony client comprising:

a network interface circuit for sending media datagrams to a remote telephony client and for receiving media datagrams from the remote telephony client;

an audio interface system for converting a media datagram received from the remote telephony client to analog audio data for driving a speaker and for converting analog audio data from a microphone to a media datagram for sending to the remote telephony client;

a datagram generation module providing a destination IP address and port number for sending the media datagram to the remote telephony client, the datagram generation module operating to:

i) extract the source IP address and source port number from the media datagram received from the remote telephony client, ii) provide the extracted IP address and port number as the destination IP address and port number for sending the media datagram to the remote telephony client if the extracted IP address does not match an IP address established by the remote telephony client for receipt of media datagrams and iii) provide the IP address and a port number established by the remote telephony client for receipt of media datagrams if the extracted IP address matches the IP address established by the remote telephony client for receipt of media datagrams;

wherein the datagram generation module further provides a source port number for sending the media datagram to the remote telephony client, the source port number being the same port number on which the media datagram is received from the remote telephony client; and wherein the audio interface circuit converts analog audio data from the microphone to a sequence of media datagrams for sending to the remote telephony client and converts a sequence of media datagrams received from the remote telephony client to analog audio data for driving the speaker and, if the extracted IP address does not match an IP address established by the remote telephony client for receipt of media datagrams, the datagram generation module operates to extract the source port number from each of the sequence of media datagrams received from the remote telephony client and provides the source port number extracted from the media datagram that was most recently received as the destination port number for each of the sequence of media datagrams sent to the remote telephony client.

44. The telephony client of claim 43, wherein the datagram generation module further operates to extract the source IP address from each of the sequence of media datagrams received from the remote telephony client and provides the source IP address extracted from the media datagram that was most recently received as the destination IP address for each of the sequence of media datagrams sent to the remote telephony client.

45. A telephony client comprising:
   a network interface circuit for sending media datagrams to a remote telephony client and for receiving media datagrams from the remote telephony client;
   an audio interface system for converting a media datagram received from the remote telephony client to analog audio data for driving a speaker and for converting analog audio data from a microphone to a media datagram for sending to the remote telephony client;
   a datagram generation module providing a destination IP address and port number for sending the media datagram to the remote telephony client, the datagram generation module operating to:
      i) extract the source IP address and source port number from the media data-ram received from the remote telephony client.
      ii) provide the extracted IP address and port number as the destination IP address and port number for sending the media datagram to the remote telephony client if the extracted IP address does not match an IP address established by the remote telephony client for receipt of media datagrams; and
      iii) provide the IP address and a port number established by the remote telephony client for receipt of media datagrams if the extracted IP address matches the IP address established by the remote telephony client for receipt of media datagrams;
   wherein the datagram generation module further provides a source port number for sending the media datagram to the remote telephony client, the source port number being the same port number on which the media datagram is received from the remote telephony client; and
   wherein the audio interface circuit converts analog audio data from the microphone to a sequence of media datagrams for sending to the remote telephony client and converts a sequence of media datagrams received from the remote telephony client to analog audio data for driving the speaker and, if the extracted IP address does not match an IP address established by the remote telephony client for receipt of media datagrams, the datagram generation module operates to store, in a memory, the source IP address and source port number from one of the media datagrams received from the remote telephony client, extract the source port number from media datagrams that are subsequently received, store an updated source port number in memory when an extracted source port number from a subsequently received media datagram is different than the source port number stored in the memory, and provide the source IP address and source port number stored in memory as the destination IP address and destination port number for each of the sequence of media datagrams sent to the remote telephony client.

46. The telephony client of claim 45, wherein the datagram generation module further operates to extract the source IP address media diagrams that are subsequently received and store an updated source IP address in memory when an IP address extracted from a subsequently received media datagram is different than the IP address stored in memory.

47. A telephony client comprising:
   a network interface circuit for sending media datagrams to a remote telephony client and for receiving media datagrams from the remote telephony client;
   an audio interface system for converting a media datagram received from the remote telephony client to analog audio data for driving a speaker and for converting analog audio data from a microphone to a media datagram for sending to the remote telephony client;
   a datagram generation module providing a destination IP address and port number for sending the media datagram to the remote telephony client, the datagram generation module operating to:
      i) extract the source IP address and source port number from the media datagram received from the remote telephony client.
      ii) provide the extracted IP address and port number as the destination IP address and port number for sending the media datagram to the remote telephony client if the extracted IP address does not match an IP address established by the remote telephony client for receipt of media datagrams; and
      iii) provide the IP address and a port number established by the remote telephony client for receipt of media datagrams if the extracted IP address matches the IP address established by the remote telephony client for receipt of media datagrams;
   wherein the datagram generation module further provides a source port number for sending the media datagram to the remote telephony client, the source port number being the same port number on which the media datagram is received from the remote telephony client; and
   wherein the audio interface circuit converts analog audio data from the microphone to a sequence of media datagrams for sending to the remote telephony client and converts a sequence of media datagrams received from the remote telephony client to analog audio data for driving the speaker and, if the extracted IP address does not match an IP address established by the remote telephony client for receipt of media datagrams, the datagram generation module operates to extract the source port number from each of the sequence of media datagrams received from the remote telephony client and provide the source port number extracted from one of the media datagrams that was received within a limited period of time prior to sending each media datagram as the port number for each media datagram sent to the remote the telephony client.

48. The telephony client of claim 47, wherein the datagram generation module further extracts the source IP address from each of the sequence of media datagram received from the remote telephony client and provides the source IP address extracted from one of the media datagram that was received within a limited period of time prior to sending each media datagram as the destination IP address number for each media datagram sent to the remote telephony client.

* * * * *